United States Patent
Fournier et al.

(10) Patent No.: US 6,679,969 B1
(45) Date of Patent: Jan. 20, 2004

(54) METHOD OF MANUFACTURING A SANDWICH PANEL, MADE OF COMPOSITE MATERIAL, AND A PANEL THEREBY OBTAINED

(75) Inventors: Alain Fournier, Saint Lys (FR); Nathalie Duret, Blagnac (FR)

(73) Assignee: Aerospatiale Matra Airbus, Paris Cedex (FR)

(*) Notice: Subject to any disclaimer, the term of this patent is extended or adjusted under 35 U.S.C. 154(b) by 273 days.

(21) Appl. No.: 09/642,650

(22) Filed: Aug. 22, 2000

(30) Foreign Application Priority Data

Sep. 21, 1999 (FR) .............................. 99 11766

(51) Int. Cl.⁷ .............................................. B29C 47/00
(52) U.S. Cl. ...................... 156/245; 428/71; 428/73; 428/117; 52/793.1; 244/133
(58) Field of Search .................. 156/79, 213, 245, 156/77, 78, 90; 428/73, 117, 118, 71, 72, 116; 244/133; 52/309.15, 793.1

(56) References Cited

U.S. PATENT DOCUMENTS 5,338,594 A  * 8/1994  Wang et al. ................ 156/197
5,567,499 A    10/1996  Cundiff et al.
5,569,508 A  * 10/1996  Cundiff ...................... 244/133
5,604,010 A  * 2/1997  Hartz et al. ................. 156/327

FOREIGN PATENT DOCUMENTS

| EP | 0722826 | 7/1996 |
| FR | 2740383 | 4/1997 |

* cited by examiner

Primary Examiner—Michael W. Ball
Assistant Examiner—John L. Goff
(74) Attorney, Agent, or Firm—Thelen Reid & Priest LLP; Robert E. Krebs

(57) ABSTRACT

In order to manufacture a sandwich panel using the RTM technique, a stack comprising a core (10) with open cells, a film (12) of intumescent material covering each of the faces of the core (10), a dry barrier fabric (14) covering each of the films (12) and an overlay of dry fibers (16) covering each of the barrier fabrics is placed in a mold. During polymerization of the films (12), pressurization of the mold and the presence of the barrier fabrics (14) prevent penetration of the foam into the overlays (16). The resin is then injected into the mold and then polymerized, without danger of penetration into the cells of the core (10).

4 Claims, 2 Drawing Sheets

METHOD OF MANUFACTURING A SANDWICH PANEL, MADE OF COMPOSITE MATERIAL, AND A PANEL THEREBY OBTAINED

TECHNOLOGICAL FIELD

The invention relates to a method of manufacturing a sandwich panel made of composite material comprising an open cell core, for example in the form of a honeycomb, using the Resin Transfer Molding (RTM) technique.

Another subject of the invention is a sandwich panel made of composite material manufactured according to this method.

STATE OF THE TECHNOLOGY

The traditional technique for manufacturing sandwich panels made of composite material consists of draping cloth or fiber fabrics impregnated with resin onto each of the two surfaces of an open cell core, most commonly constituted by a honeycomb structure. The blank obtained is then placed in an autoclave or is subjected to a polymerization cycle that enables one to ensure curing of the resin.

This traditional technique has the particular disadvantages of being expensive and difficult to implement. In effect, the draping operations are carried out either manually or using very complex machines. Furthermore, in practice, it is not possible to obtain two perfectly identical items and the surface finish of these items is rather poor.

Having regard to these disadvantages, the traditional technique of draping is being replaced more and more frequently by the RTM technique, in order to manufacture very diverse items (items of large size, with complex geometry, functional integration etc.) particularly in high technology industries such as the aeronautic, automobile and naval industries.

The RTM technique consists of placing a preform of dry fibers in a mold, evacuating it and injecting into it, at low pressure, a resin that has a very low viscosity. Applying a polymerization cycle allows curing of the resin, before the item is stripped from the mold.

When the RTM technique is applied to the manufacture of a sandwich panel having an open cell core, for example in the form of a honeycomb, precautions must be taken to prevent the resin injected into the mold filling up the cells of the core of the item. Various solutions to this problem have already been proposed.

A first known solution, described in document EP-A-0 722 825, consists of interposing successively an adhesive film and a fold of fibers pre-impregnated with resin between each of the faces of the open cell core and the overlay of dry fibers. After putting this assembly into place in the mold and closing it, a first polymerization cycle enables one to cure the resin contained in the pre-impregnated fold of fibers and to stick it onto the corresponding face of the open cell core. The very low viscosity resin is subsequently injected into the mold in a way that fills the dry fiber overlays. The mold is opened after polymerization of the injected resin.

This technique enables one to avoid filling up the open cells of the core of the component with the low viscosity resin injected into the mold. However, it has the disadvantage of leading to the manufacture of a component that includes three different resins, which means that the skins are not homogeneous and this can lead to problems of adherence of the overlays to the core of the item. In addition, this technique requires the use of three elements (counting the overlay of dry fibers) and a two phase manufacturing cycle (polymerization of the resin contained in the pre-impregnated fibers and then injection of the RTM resin and finally polymerization of this resin). The pre-impregnated fibers require the polymerization phase so they act as a barrier. Furthermore, the presence of folds of fibers impregnated with resin tends to make the component obtained heavier. In effect the mass per unit surface area of such components is about 500 $g/m^2$ (this value is multiplied by two in order to take into account both sides of the panel). Finally manufacture takes a long time.

Another known solution, described in document FR-A-2 740 383, consists of interposing an adhesive film and a sealing membrane between each of the faces of the open cell core and the corresponding overlay of dry fibers. After closing the mold, the adhesive is polymerized in such a way that each of the membranes is stuck onto the open cell core and then the low viscosity resin is injected into the mold and polymerized.

In comparison with the previous technique, this one simplifies the polymerization cycle and enables one to reduce the mass of the component. However, this technique is not easy to use for the manufacture of panels with complex geometry. In effect, the sealing membrane is difficult to deform and this leads to problems of folds and creases when it is being placed over a core which is not flat.

A third technique for manufacturing sandwich panels is proposed in document EP-A-0 722 826. In this case, an intumescent film is interposed between each of the faces of the open cell core and the overlay of dry fibers. After closing the mold, a cycle of expansion and polymerization of the intumescent films has the effect of filling the open cells of the core with foam. The low viscosity resin is subsequently injected into the mold and then polymerized.

When it is implemented in a single phase, this technique enables one to provide direct adhesion of the injection resin onto the open cell core. However, it has the particular disadvantage that the foam formed by the intumescent films during the expansion and polymerization cycle of these films, is also propagated into the dry fiber overlays which they partially fill up to the surface of the panel. As a consequence, the resin subsequently injected into the mold only fills a part of the dry fiber overlays. Under these conditions, the component obtained does not have the desired mechanical properties. In addition, the integral filling of the cells of the core by the foam leads to an undesirable increase in the mass of the panel finally obtained.

When it is implemented in two phases, this technique becomes more difficult. In effect, firstly one must apply a cycle for expansion of the intumescent film and then proceed with the injection of the resin and its polymerization which complicates the operation.

In the embodiment described with reference to FIG. 5 in this document EP-A-0 722 826, it is proposed to combine the technique which has just been described with the technique disclosed in document EP-A-0 722 825. In other words, it is suggested that an adhesive film and a fold of pre-impregnated film are interposed between each of the intumescent films and the corresponding overlay of dry fibers. Then, the expansion and the polymerization of the intumescent films, the polymerization of the adhesive and the polymerization of the resin which is impregnated into the pre-impregnated folds of fibers are carried out simultaneously, during one and the same polymerization cycle. As in the other cases, the low viscosity resin is then injected into the mold and then polymerized.

It may be thought that this latter technique enables one to avoid the migration of the foam to the inside of the overlays of dry fibers, because of the presence of the folds of fibers pre-impregnated with resin, between the intumescent films and the overlays of dry fibers.

However, the manufacturing time of the panel is substantially increased because the first polymerization cycle must ensure the expansion and the polymerization of the intumescent films, the polymerization of the adhesive and the polymerization of the resin contained in the pre-impregnated folds of fibers, all at the same time. Furthermore, all the disadvantages of the technique described in document EP-A-0 722 825 are again found in this case, that is to say, in particular, an increase in the mass of the panel and problems of heterogeneity of the skins and problems of adherence between the various layers.

Furthermore, a sandwich panel is known from document EP-A-0 628 406, made of composite material manufactured in accordance with the traditional draping technique and in which the life of the panel is increased by interposing an intumescent film between one of the skins and the honeycomb core. More precisely, the foam formed by the polymerization of the intumescent film only fills the honeycomb cells of the core close to the face corresponding to it.

DESCRIPTION OF THE INVENTION

The main subject of the invention is a method of manufacturing a sandwich panel made of a composite material using the RTM technique which enables one to obtain, in a single phase, that is to say, in a very short time, a component with a simple, light structure, in which the injected low viscosity resin is directly stuck onto the open cell core, without requiring a manufacturing cycle that is too complicated.

Conforming to the invention, this result is obtained by means of a method of manufacturing a sandwich panel made of composite material, characterized in that it comprises the following steps:

placing, in a mold, an assembly comprising an open cell core, a film of intumescent material covering each of the faces of the core, a dry barrier fabric covering each of the films and an overlay of dry fibers covering each of the barrier fabrics, said barrier fabrics being sealed against a foam capable of being provided during the polymerization of said films and which can be wetted by a resin capable of being injected into the mold;

closing the mold;

pressurizing and heating the mold according to a cycle for the expansion and polymerization of the intumescent material, in a way that forms said foam, closing off the cells of the core on each of its faces, without impregnating the dry barrier fabrics;

evacuating the mold and injecting said resin into it in a manner that impregnates the overlays of dry fibers and the dry barrier fabrics;

carrying out a cycle for polymerization of the resin;

stripping the panel obtained from the mold.

In this method, the dry barrier fabrics combined with pressurization of the mold prevent any penetration of the foam formed by the intumescent films during their polymerization, into the overlays of dry fibers. On the other hand, these dry barrier fabrics are impregnated at the same time as the overlays of dry fibers during the injection of the resin into the mold, in such a way that this adheres directly to each of the faces of the open cell core, without filling up said cells, because they have already been blocked off by the foam.

It should also be noted that the only function of the polymerization cycle prior to the injection of the resin into the mold is to ensure the expansion and the polymerization of the intumescent films. It is therefore a particularly simple operation that is easy to carry out.

It should be noted that a man skilled in the art who desires to resolve the problem posed by the filling up of the honeycomb structure, will quite naturally use a fold of fibers impregnated with resin. The use of a polyamide fabric from the textile industry would appear, on the contrary, to be a surprising solution for a specialist from the aeronautics industry. Such a fabric does not require any particular action to act as a barrier and provides a seal for the honeycomb. Its simple application is sufficient. It therefore permits the creation of the component in a single phase (gain in manufacturing time: a week instead of a month for a normal manufacturing cycle), a benefit in mass and in cost.

So as to illustrate the mass benefit obtained by using a fabric conforming to the invention, it should be noted that the mass per unit surface area of the panel obtained is about 30 to 40 $g/m^2$ (value to be multiplied by two to take account of the two sides of the panel). This value should be compared with about 500 $g/m^2$ (also to be multiplied by two) obtained by using the technique described in document EP-A-0 722 825.

Advantageously, intumescent films are used that have a thickness such that after polymerization, they only fill those parts of the cells of the core close to the faces of the core. This arrangement, which corresponds especially to the use of intumescent films with a thickness of about 2.5 mm, enables one to limit the mass of the panel obtained by reducing the volume of foam contained in the cells of the core.

In addition, preferably, barrier fabrics made of calendered polyamide are used, that is to say, made of polyamide which has been subjected to a mechanical finishing treatment.

Another subject of the invention is a sandwich panel made of a composite material comprising an open cell core and skins covering both faces of the core, said skins being formed of fibers and resin, a panel characterized in that the cells of the core are closed off by a foam on each of said faces, and in that each of the skins comprises, starting from the core of the panel, a barrier fabric and a fiber overlay, both of which are impregnated with one and the same resin polymerized and stuck onto the core of the panel.

BRIEF DESCRIPTION OF THE DRAWINGS

A preferred embodiment of the invention will now be described by way of example and making reference to the appended drawings, in which.

DETAILED DESCRIPTION OF A PREFERRED EMBODIMENT OF THE INVENTION

Like any method using the technique of molding by the transfer of resin, the method according to the invention uses a mold (not shown) that internally defines a cavity, the shape and dimensions of which correspond to those of the panel to be manufactured. It should be noted that this shape and these dimensions can be of any kind, without departing from the scope of the invention. In particular, the method conforming to the invention enables one to manufacture both a flat panel or a panel having a more complex shape.

Figure 1:
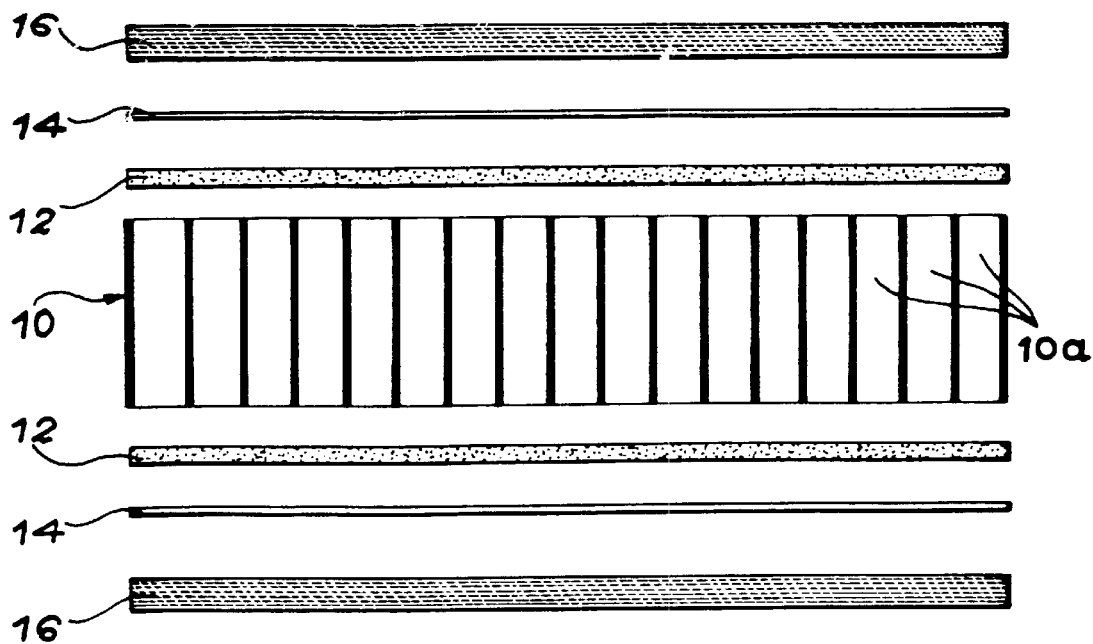
FIG. 1 is a section view which shows diagrammatically and in an exploded fashion the different elements of an assembly capable of being placed in a mold so as to manufacture a sandwich panel made of composite material by the RTM technique and conforming to the invention.
Figure 3:
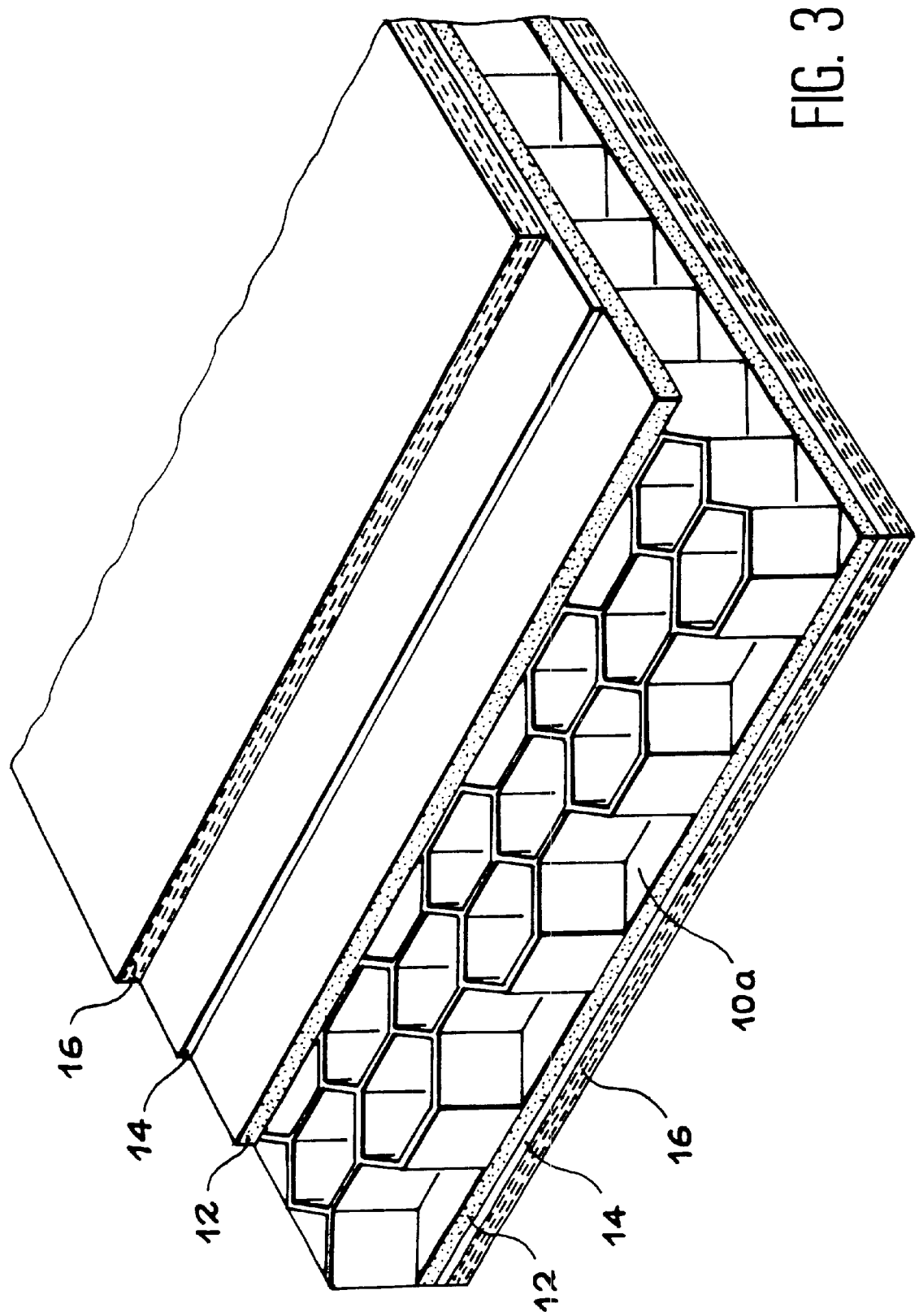
FIG. 3 is a perspective view, with cutaways in section, showing a closed mold in which the various elements making up the panel have been placed, conforming to the invention.

As FIGS. 1 and 3 illustrate, an assembly is placed in the mold cavity comprising an open cell core 10, a film 12 of intumescent material, integrally and directly covering each of the two faces of the core 10, a dry barrier fabric 14 integrally and directly covering each of the films 12, and an overlay 16 of dry fibers integrally and directly covering each of the barrier fabrics 14. When it is placed in the mold cavity, the stack formed by this assembly integrally fills this cavity.

The open cell core 10 can be produced in any material with open cells that can be used for the manufacture of a sandwich panel made of composite material. In particular, this core may have a honeycomb structure, defining cells 10a, for example cells of hexagonal section, emerging on each of the two faces of the structure. The nature of the material in which the core 10 is formed, the thickness of it and the size of the cells 10a, depends on the application envisaged.

Each of the two films 12 is produced in a material capable of forming a closed cell foam when it has been subjected to a suitable cycle of expansion and polymerization. This material is chosen notably for its lightness and its ability to form a barrier that opposes the entry into the cells 10a of the resin to be injected into the mold. By way of an example, that is in no way limitative, this material can notably be a reference film Synspand 9899 CF-100 mil, sold by the company DEXTER HYSOL.

Preferably, the thickness of each of the films 12 of intumescent material is chosen so that the foam formed after the expansion and polymerization cycle for this material, only fills those parts of the cells 10a situated close to the two faces of the core 10. To this end, advantageously films 12 of intumescent material with a thickness of about 2.5 mm are used.

The dry barrier fabrics 14 are fine light fabrics, which are chosen mainly as a function of their porosity. More precisely, it is essential that these fabrics form a seal against the foam formed by the polymerization of the intumescent material constituting the films 12, while being wettable by the resin of very low viscosity subsequently injected into the mold. By way of a non-limitative example, the dry barrier fabrics 14 can notably be produced in calendered polyamide, that is to say that they are constituted by polyamide fabrics that have been subjected to a mechanical finishing treatment. The porosity of these fabrics has been characterized by the measurement of the flow rate of air passing through the barrier fabric on applying a pressure of from 200 Pa to 130 Pa. The value of 59 $l/m^2/s$ is satisfactory. Nevertheless, these tests have given values ranging from 9 $l/m^2/s$ to 42 $l/m^2/s$ for a pressure of 130 Pa and ranging from 13 $l/m^2/s$ to 59 $l/m^2/s$ for a pressure of 200 Pa. These values are given for information purposes and do not therefore have any restrictive character. They are linked to the type of resin used.

The dry fiber overlays 16 are prepared in accordance with the usual techniques used to carry out the resin transfer molding process, from long fibers chosen and orientated to satisfy the mechanical properties required for the envisaged application.

When the stack constituting the assembly illustrated in exploded fashion in FIG. 1 has been placed in the mold cavity (FIG. 3), this is closed and pressurized.

Figure 2:
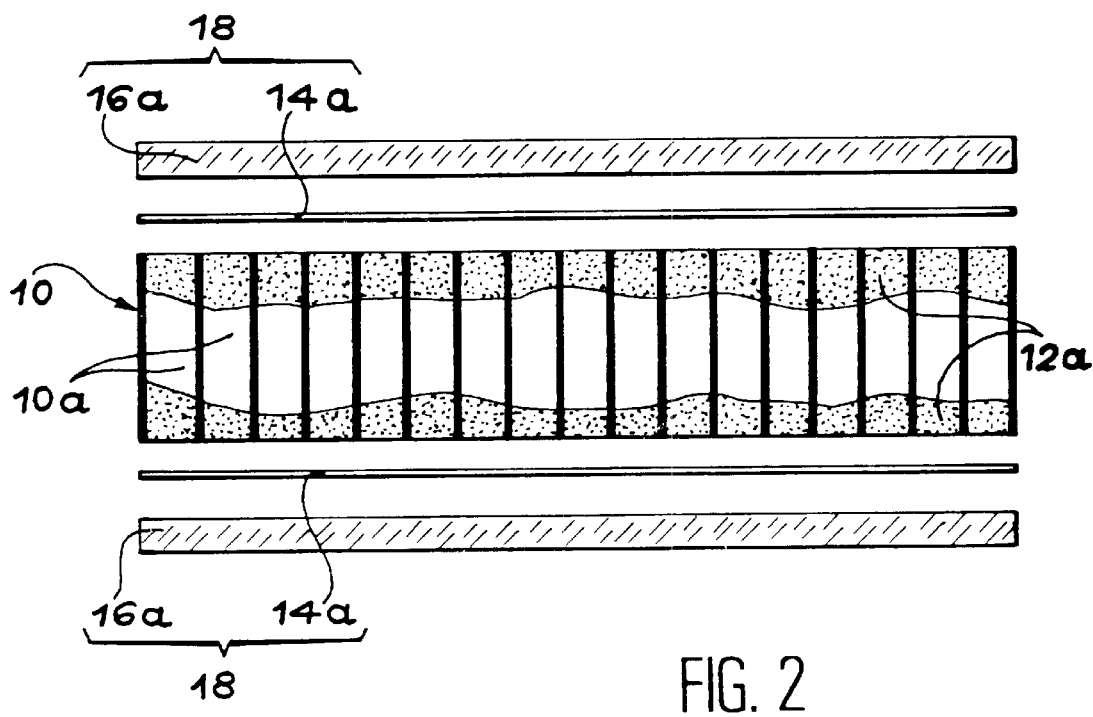
FIG. 2 is a section view diagrammatically representing in an exploded fashion a composite panel obtained from the assembly of the elements illustrated in FIG. 1.

The mold is then heated according to an expansion and polymerization cycle for the intumescent material used to form the films 12. During this cycle, the duration and temperatures of which depend on the nature of the chosen intumescent material, it is converted into a foam 12a, which partially penetrates the cells 10a, as shown in FIG. 2. As has already been observed, this foam is characterized by closed cells, which have the effect of integrally closing off the cells 10a on the two faces of the core 10.

When the film of intumescent material 12 has a limited thickness, for example, about 2.5 mm, the foam only penetrates into those parts of the cells 10a close to the two faces of the core 10.

Conforming to the invention, during this expansion and polymerization cycle for the intumescent material, the presence of dry barrier fabrics 14 combined with pressurization of the mold have the effect of preventing any expansion of the foam 12a towards the outside and particularly to the interior of the dry fiber overlays 16. At the end of the expansion and polymerization cycle for the intumescent material, that is to say after complete curing of the foam 12a, the two overlays of dry fibers 16 and the dry barrier fabrics 14 are not impregnated with foam at all. On the other hand, the core 10 is totally blocked off on both faces by the foam 12a.

The pressure applied in the mold is then released and it is evacuated and brought to temperature for injection of the very low viscosity resin. This temperature is generally less than the polymerization temperature of the intumescent material. It depends on the nature of the resin that one wishes to inject.

The injection is then carried out in accordance with the techniques used in traditional fashion in resin transfer molding processes. The two dry fiber overlays 16 and the two barrier fabrics 14 are then impregnated with resin over their entire thickness and in the assembly of the panel to be manufactured. The resin then comes directly into contact with the two faces of the core 10 of the panel. Hence perfect adherence of the skins constituted by the overlays impregnated with resin 16a and by the barrier fabrics impregnated with resin 14a is achieved over both faces of the core 10.

Next, in traditional fashion, a new polymerization cycle is applied for the resin which has just been injected. The temperatures and durations of the different steps of this cycle depend on the nature of the resin used.

After cooling, the mold is opened and the sandwich panel obtained is then extracted from it.

The description above shows that the panel obtained in this way is free of resin on the inside of the open cells of the core 10, while the overlays 16a and the barrier fabrics 14a forming the skins 18 of the panel are totally filled with resin and are free of foam 12a. Furthermore, the structure of the panel is particularly simple and the impregnation of the barrier fabrics 14 by the resin enables one to guarantee perfect adherence of the skins onto the core of the panel.

The description above also shows that implementation of the method is particularly simple and rapid since the first polymerization cycle is restricted to the expansion and to the polymerization of the intumescent material in which the films 12 are formed.

What is claimed is:

1. A Method of manufacturing a sandwich panel made of composite material, the method comprising:

placing, in a mold, an assembly consisting of an open cell core, a film of intumescent material covering each of the faces of the core, a dry barrier fabric covering each of the films and an overlay of dry fibers covering each of the barrier fabrics, said barrier fabrics being sealed directly against a foam capable of being provided during the polymerization of said films and which can be wetted by a resin capable of being injected into the mold;

closing the mold;

pressurizing and heating the mold according to a cycle for the expansion and polymerization of the intumescent material, in a way that forms said foam, closing off the cells of the core on each of its faces, without impregnating the dry barrier fabrics;

evacuating the mold and injecting said resin into it in a manner that impregnates the overlays of dry fibers and the dry barrier fabrics;

carrying out a cycle for polymerization of the resin; and stripping the panel obtained from the mold.

2. Method according to claim 1, in which films are used of a thickness such that after polymerization, said foam only fills the parts of the cells of the core which are close to the faces of the core.

3. Method according to claim 2, in which films are used which have a thickness of about 2.5 mm.

4. Method according to claim 1, in which barrier fabrics made of calendered polyamide are used.

* * * * *